(12) United States Patent
Sakaguchi et al.

(10) Patent No.: US 11,273,675 B2
(45) Date of Patent: Mar. 15, 2022

(54) TIRE

(71) Applicant: SUMITOMO RUBBER INDUSTRIES, LTD., Hyogo (JP)

(72) Inventors: Tetsuya Sakaguchi, Hyogo (JP); Yuichi Ishigaki, Hyogo (JP); Hiroshi Fujita, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 220 days.

(21) Appl. No.: 16/793,457

(22) Filed: Feb. 18, 2020

(65) Prior Publication Data
US 2020/0262252 A1 Aug. 20, 2020

(30) Foreign Application Priority Data
Feb. 19, 2019 (JP) .............................. JP2019-027580

(51) Int. Cl.
*B60C 13/00* (2006.01)

(52) U.S. Cl.
CPC .................. *B60C 13/001* (2013.01)

(58) Field of Classification Search
CPC ....... B60C 13/001; B60C 13/00; B60C 13/02; B60C 13/002; B60C 2011/1361
See application file for complete search history.

(56) References Cited

U.S. PATENT DOCUMENTS

| 8,875,763 B2 | 11/2014 | Paturle | |
| 2010/0051159 A1* | 3/2010 | Fujioka | B60C 13/001 |
| | | | 152/523 |
| 2014/0166177 A1* | 6/2014 | Muhlhoff | B60C 13/001 |
| | | | 152/523 |
| 2018/0099530 A1* | 4/2018 | Yonetsu | B29D 30/72 |
| 2020/0346497 A1* | 11/2020 | Kamada | B60C 13/00 |

FOREIGN PATENT DOCUMENTS

| DE | 102014203426 A1 * | 8/2015 | ............ B60C 13/02 |
| JP | 2009-512584 A | 3/2009 | |
| JP | 2013071669 A * | 4/2013 | |
| WO | WO-2016015898 A1 * | 2/2016 | ........... B60C 13/001 |

OTHER PUBLICATIONS

JP 2013071669 Machine Translation; Minami, Yuji (Year: 2013).*
DE 102014203426 Machine Translation; Kreiger, Ralf (Year: 2015).*
WO 2016015898 Machine Translation; Behr, Ulrich (Year: 2016).*

* cited by examiner

*Primary Examiner* — Katelyn W Smith
*Assistant Examiner* — Nicholas J Weiler
(74) *Attorney, Agent, or Firm* — Greenblum & Bernstein, P.L.C.

(57) ABSTRACT

A tire has a visible outer surface comprising a decorative region provided with a plurality of micro-protrusions each comprising a recess and a wall portion. The wall portion surrounds the recess to form a protrusion's apex having an upper surface, and the upper surface of the wall portion comprises a peak point and a bottom point in a protruding-height direction of the micro-protrusion, wherein a protruding amount at the peak point is larger than a protruding amount at the bottom point.

15 Claims, 9 Drawing Sheets

TIRE

TECHNICAL FIELD

The present invention relates to a tire provided with a decorative region.

BACKGROUND ART

Patent document 1 below discloses a tire whose sidewall is provided with a number of tufts in the form of a substantially circular cone. The tufts form a texture to enhance the black color of the tire sidewall, and thereby, contrast with markings, e.g. a name of the tire and the like is increased to improve the visibility of the markings.
Patent document 1: Japanese Patent Application Publication No. 2009-512584

SUMMARY OF THE INVENTION

Problems to be Resolved by the Invention

In recent years, it is required to further increase such contrast in order to further improve the visibility of markings. Therefore, the present invention was made in view of the circumferences as above, and
it is an object of the present invention to provide a tire in which visibility of markings and the like can be further improved.

According to the present invention, a tire has a visible outer surface comprising a decorative region provided with a plurality of micro-protrusions each comprising a recess and a wall portion, the above-said wall portion surrounding the recess and forming a protrusion's apex having an upper end surface, and the above-said apex comprising a peak point and a bottom point in a protruding-height direction of the micro-protrusion wherein a protruding amount of the peak point is larger than a protruding amount of the bottom point.

It is preferable that the upper end surface is a slant surface inclined with respect to the protruding-height direction, and an upper end and a lower end of the slant surface in the protruding-height direction define the peak point and the bottom point, respectively.

The slant surface may be a flat surface or a curved surface which is a part of a sphere.

It is preferable that, in the decorative region, 2 to 10 micro-protrusions are disposed per 1 sq·mm.

It is preferable that the micro-protrusions include a micro-protrusion whose contour in its transverse section perpendicular to its protruding-height direction is a circle or alternatively an oval.

It is preferable that the micro-protrusions include a micro-protrusion whose contour in its transverse section perpendicular to its protruding-height direction is smaller in its upper end side than its lower end side in the protruding-height direction.

It is preferable that the micro-protrusion whose contour is smaller in its upper end side than its lower end side, comprises a part in the protruding-height direction in which the contour becomes smaller continuously or in a stepwise manner toward the upper end.

In the above-said part at which the contour in the transverse section of the micro-protrusion becomes smaller in a stepwise manner toward the upper end,
it is preferable that, at a position at which the contour changes from a larger contour to a smaller contour, a part of the larger contour coincides with a part of the smaller contour.

It is preferable that the contour of the recess in its transverse section perpendicular to its depth direction is a circle or alternatively an oval.

It is preferable that the contour of the recess in its transverse section perpendicular to its depth direction is larger in its upper end side than its lower end side in the depth direction.

It is preferable that the recess comprises a part in which the contour of the recess in its transverse section becomes larger continuously or alternatively in a stepwise manner toward the upper end.

In the above-said part in which the contour of the recess in its transverse section becomes larger in a stepwise manner toward the upper end,
it is preferable that, at a position at which the contour changes from a larger contour to a smaller contour, a part of the larger contour coincides with a part of the smaller contour.

It is preferable that the decorative region other than the micro-protrusions comprises a concave-convex surface whose 10-point average roughness (Rz) is in a range from 0.01 to 0.05 mm.

Therefore, in the decorative region of the tire according to the present invention, the light irradiated on the apex of the micro-protrusion is partly absorbed by the recess, and partly reflected by the upper end surface of the wall portion, and the reflected light is diffused by the upper end surface with the peak and bottom points. Thus, by the synergistic effect of these, it is possible to make the decorative region more matte-black in comparison with micro-protrusions having a circular-truncated-cone-like form not provided with the recess at the upper end.
As a result, the contrast with non-decorative regions which are formed adjacently to or in the decorative region so as to constitute markings and the like, can be increased, therefore, the visibility of the markings is improved.

DESCRIPTION OF THE PREFERRED EMBODIMENTS

Embodiments of present invention will now be described in detail in conjunction with accompanying drawings.

Figure 1:
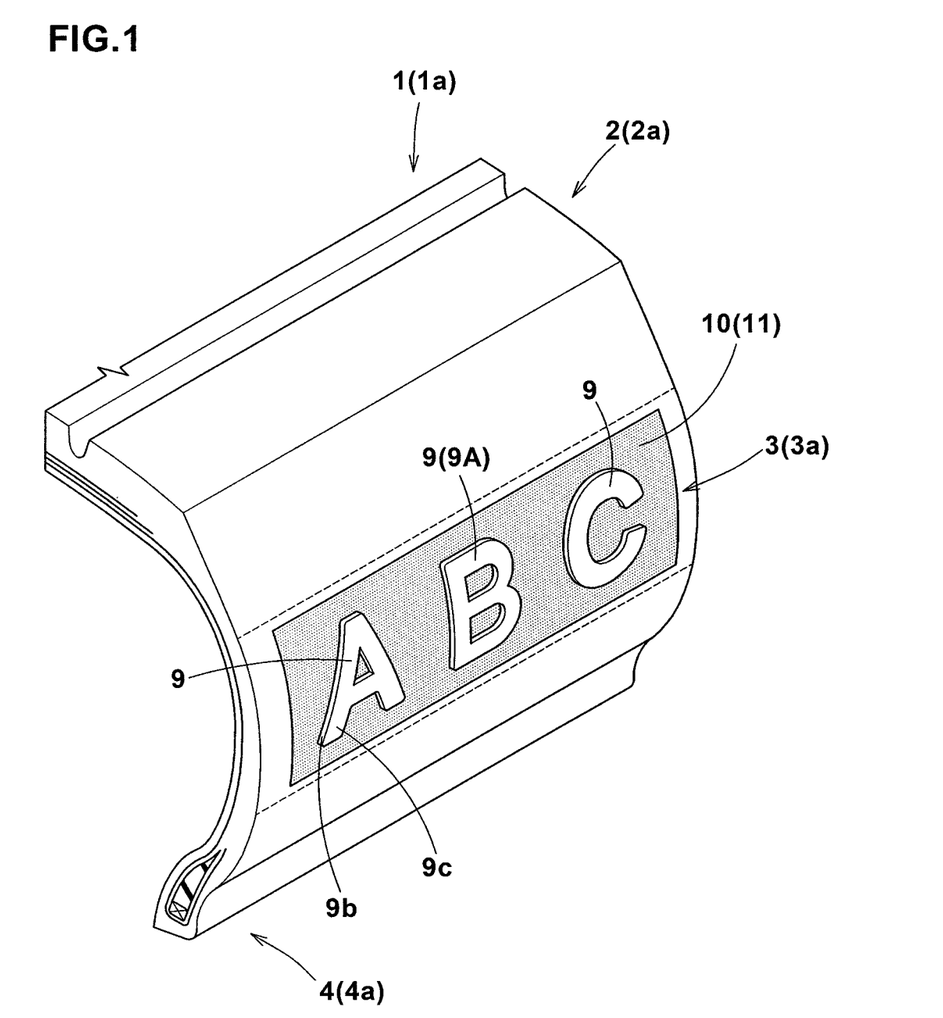
FIG. 1 is a perspective partial view of a tire as an embodiment of the present invention showing a part of a sidewall portion thereof.

FIG. 1 show a tire 1 as an embodiment of the present invention. In this embodiment, the tire 1 is a pneumatic tire for passenger cars. However, the present invention can be applied to various tires including pneumatic tires and non-pneumatic tires for various vehicles including passenger cars, motorcycles, heavy duty vehicles such as truck and bus, and the like.

Here, as well known in the tire art, a pneumatic tire comprises a tread portion whose outer surface defines the tread, a pair of axially spaced bead portions mounted on bead seats of a wheel rim, a pair of sidewall portions extending between the tread edges and the bead portions, a carcass extending between the bead portions through the tread portion and the sidewall portions, and a tread reinforcing belt disposed radially outside the carcass in the tread portion.

The tire 1 has a visible outer surface 1a which is, in this embodiment, defined as that of the tire mounted on a wheel rim (not shown), namely, the visible outer surface 1a includes the outer surface 2a of the tread portion 2, the outer surface 3a of the sidewall portions 3 and the outer surface 4a of the bead portions 4 as shown in FIG. 1.

In the tire 1 in this embodiment, a decorative region 10 and a non-decorative region 9 adjacent thereto are formed in a part of the outer surface 1a.

In this embodiment, the non-the decorative region 9 and the decorative region 10 are formed within the outer surface 3a of at least one of the sidewall portions 3.
However, the non-decorative region 9 and the decorative region 10 may be formed in the outer surface 4a of the bead portions 4, even in the outer surface 2a of the tread portion 2.

The non-decorative region 9 in this embodiment is a raised region 9A raising from the outer surface 3a (or 1a). The raised region 9A is defined by a side surface 9b extending outwardly from the outer surface 3a and a flat and smooth top surface 9c continued from the side surface 9b. Such top surface 9c may reflect the irradiated light and serve to show the non-decorative region 9 brightly.
The non-decorative region 9 is formed as markings which are characters and/or symbols presenting the manufacturer, trade name, size and the like of the tire 1 for example.

Figure 2:
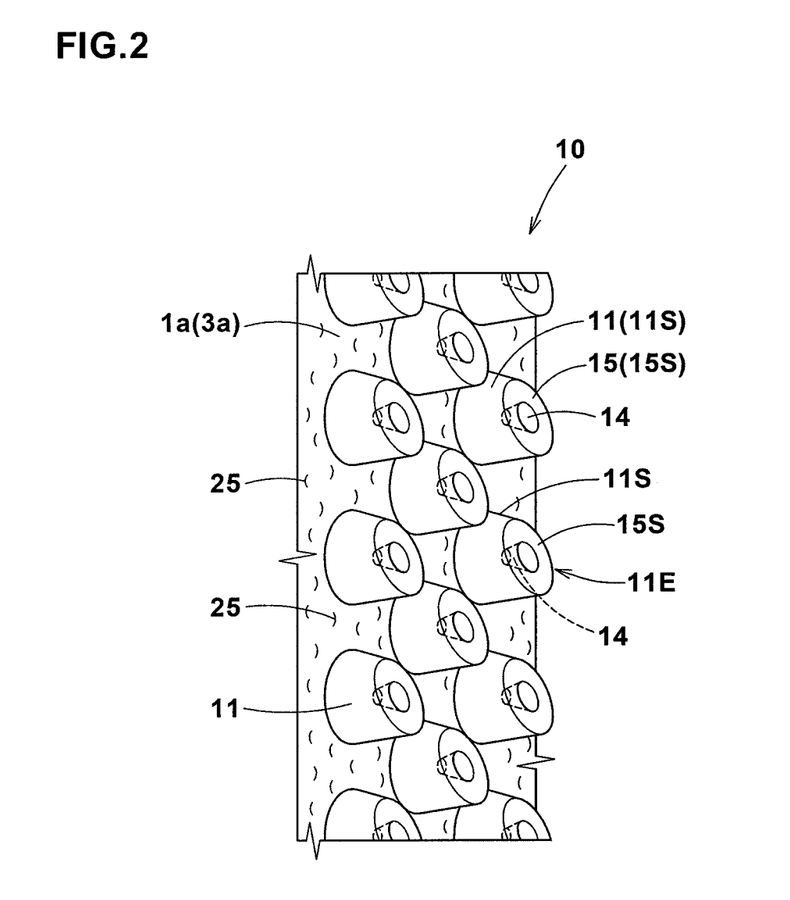
FIG. 2 is an enlarged perspective partial view of an example of the decorative region shown in FIG. 1.

FIG. 2 is a perspective view of a part of the decorative region 10 in FIG. 1.

In the decorative region 10 in this embodiment, the density of the micro-protrusions disposed therein is 2 to 10 micro-protrusions 11 per 1 sq·mm.

In the outer surface 3a, the micro-protrusions 11 protrude axially outwardly therefrom.

At least some of the micro-protrusions 11 are each provided with a recess 14 and a wall portion 15.
The wall portion 15 surrounds the recess 14 and forms the apex 11E of the micro-protrusion in a tube-like form in this example.

In the decorative region 10 in this embodiment, substantially all of the micro-protrusions 11 disposed therein are each provided with the recess 14 and the wall portion 15.

When such micro-protrusions 11 are irradiated with light, their outer surfaces 11S diffuse the irradiated light. This helps to make the decorative region 10 matte-black.
The light irradiated to the apex 11E is absorbed by the recess 14, and reflected by the upper end surface 15S of the wall portion 15 only, therefore, the apex 11E may be seen as black or dark. Thus, the contrast with the non-decorative region 9 is increased, and the visibility of the decorative region 10 is improved. This effect is more effectively exhibited by disposing the micro-protrusions 11 at a density of from 2 to 10 micro-protrusions 11 per 1 sq·mm.

Figure 3A:
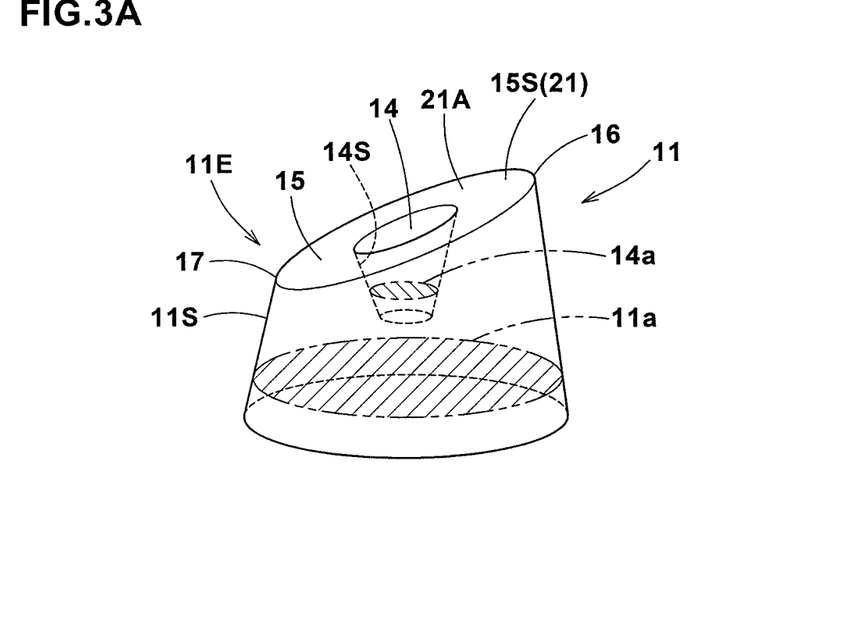
FIGS. 3A and 3B are a perspective view and a side view of an example of the micro-protrusion.

FIG. 3A is a perspective view of the micro-protrusion 11. As show in FIG. 3A, the wall portion 15 of the micro-protrusion 11 is provided with a peak point 16 at which the protruding amount of the micro-protrusion 11 is maximum and a bottom point 17 at which the protruding amount is minimum.

Figure 4A:
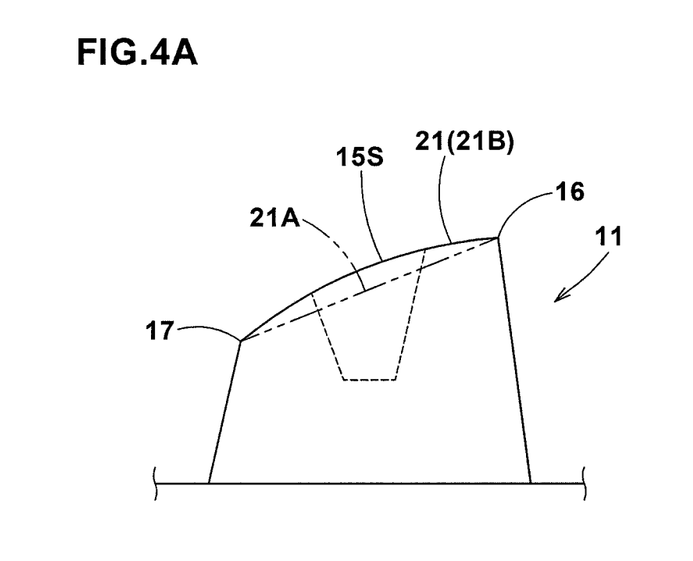
FIGS. 4A and 4B are side views of other examples of the micro-protrusions.
Figure 4B:
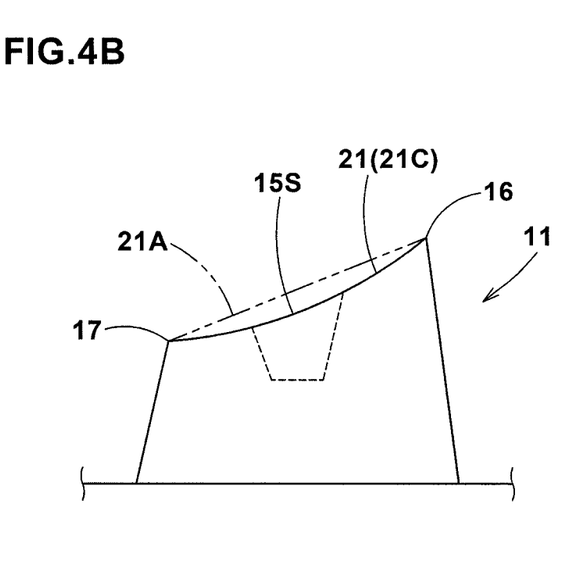

In this embodiment, the upper end surface 15s of the wall portion 15 is a slant surface 21 inclined with respect to the protruding-height direction, and
the upper end and lower end of the slant surface 21 form the peak point 16 and the bottom point 17, respectively.
In this embodiment, the slant surface 21 is a flat surface 21A. However, from the standpoint of the diffusion of light, it is preferable that the slant surface 21 is a convexly curved surface of a part of a sphere 21B, or a convexly curved surface of a part of a sphere 21C as shown in FIGS. 4A and 4B.

Since the upper end surface 15S of the wall portion 15 is formed by the surface having the peak point 16 and the bottom point 17 as explained above, the upper end surface 15S also causes diffusion of light and helps to make the hue of the protrusion's apex 11E further blackish.
In the present invention, in comparison with the circular-truncated-cone-like micro-protrusion which is not provided with the recess 14 at the upper end, it is possible to make the decorative region 10 more matte-black, owing to the synergistic effect of
the diffusion of light due to the outer surfaces 11S of the micro-protrusions 11,
the absorption of light due to the recesses 14, and
the diffusion of light due to the upper end surfaces 15S of the wall portions 15 as explained above. As a result, the contrast of the decorative region 10 with the non-decorative region 9 is increased and the visibility thereof is improved.

In this embodiment, the slant surfaces 21 of the micro-protrusions 11 in one decorative region 10 are inclined in the same direction. However, it is also possible that the micro-protrusions 11 disposed in one decorative region 10 includes plural kinds of the micro-protrusions 11 having the slant surfaces 21 inclined in different directions from the standpoint of the diffusion of light.

The micro-protrusion 11 has a contour 11a of a transverse section thereof taken perpendicularly to the protruding-height direction which is preferably a circle or an oval.

When the contour 11a is a circle, the irradiation light from all directions is diffused in the same manner irrespectively of the directions, that is, the above-said effect is non-directional, therefore, the contrast can be stably increased.

When the contour 11a is an oval, the effect of diffusing the irradiated light is varied depending on the irradiation directions. For example, it is possible to make the contrast different between an irradiation direction along the major axis of the oval and an irradiation direction along the minor axis of the oval, that is, the contrast of the decorative region 10 is provide with a directional dependency, therefore, it is possible to give a kind of unpredictability to the appearance of a marking made up of the decorative region 10 and the non-decorative region 9.

It is preferable that the contour 11a of the transverse section of the micro-protrusion 11 is made smaller in its upper end portion (on the protrusion's apex 11E side) than in its lower end portion (on the protrusion's root side).
The rigidity of such micro-protrusion 11 becomes higher in the lower end portion, and its deformation is suppressed, therefore, the micro-protrusion 11 is prevented from tearing off and cracking, and the improved visibility can be maintained for a long period term.

In this embodiment, the contour 11a of the transverse section of the micro—the protrusion 11 is continuously decreased from the lower end to the upper end. More specifically, the external form of the micro-protrusion 11 is tapered from the lower end to the upper end, namely, over the entire protruding height. The external form is however, not to be limited thereto.

Figure 3B:
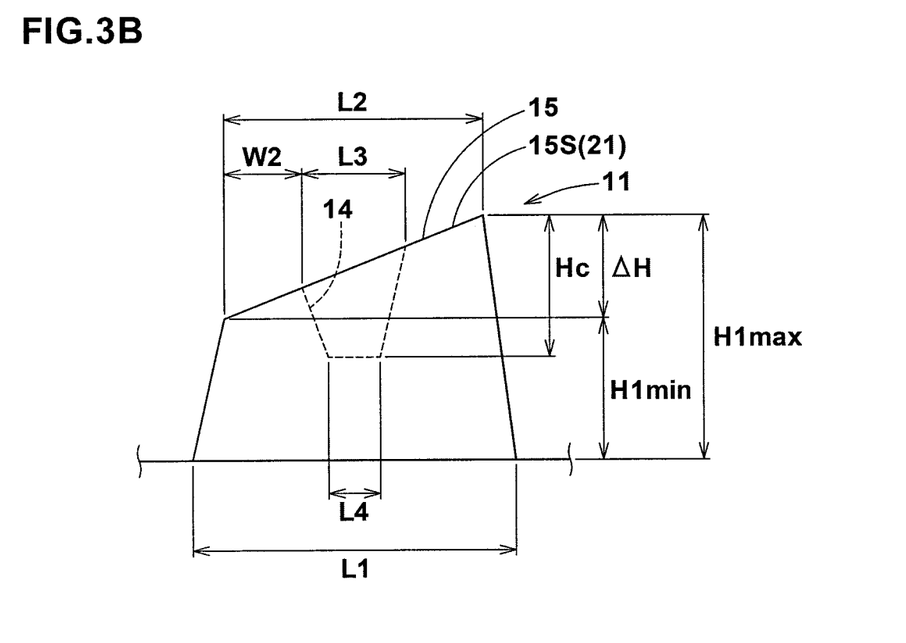

It is preferable that, as shown in FIG. 3B, the maximum width L1 of the micro-protrusion 11 is 0.30 to 1.00 mm. The maximum width L1 occurs at the lower end of the micro-protrusion 11. This makes it possible to secure a large shadow of the micro-protrusion 11 by the irradiated light. If the maximum width L1 is less than 0.30 mm, then the rigidity of the micro-protrusion 11 is decreased, therefore, there is a possibility that cracks and torn-off becomes easily occur.
If the maximum width L1 is more than 1.00 mm, there is a possibility that the light reflected by the outer surface 11S of the micro-protrusion 11 is increased, and the contrast with the non-decorative region 9 is decreased.

In order to effectively derive the above-mentioned advantageous effects, it is preferred that the minimum width L2 of the micro-protrusions 11 is from 0.25 to 0.95 mm.
The minimum width L2 occurs the upper end of the micro-protrusion 11. Thereby, it is possible to provide a part becoming darker while maintaining the rigidity.

The micro-protrusion 11 has a maximum height H1max at the peak point 16, and a minimum height H1min at the bottom point 17. Preferably, the maximum height H1max is from 0.20 to 0.60 mm. If the maximum height H1max is less than 0.20 mm, then the micro-protrusion 11 becomes too low to exert the light diffusion effect, therefore, it becomes difficult to obtain a desired contrast. If the maximum height H1max is more than 0.60 mm, the micro-protrusion 11 is liable to be damaged because of its height.

It is preferable that the minimum height H1min is from 0.10 to 0.50 mm.

It is preferable that the difference dH=(H1max−H1min) between the maximum height H1max and the minimum height H1min is from 0.10 to 0.40 mm.
If the difference dH is less than 0.10 mm, it becomes difficult to obtain the light diffusion effect at the upper end surface 15s of the wall portion 15. If more than 0.40 mm, damage is liable to occur at the peak point 16.

It is preferable that the thickness W2 of the wall portion 15 in the upper end is not more than 0.20 mm. If the thickness W2 is more than 0.20 mm, then the recess 14 becomes small. As a result, there is a tendency that the effect to make the micro-protrusion 11 further blackish is decreased. It is preferable that the thickness W2 is at least 0.05 mm. If the thickness W2 is less than 0.05 mm, the rigidity of the micro-protrusion 11 becomes low, and the micro-protrusion 11 is liable to be damaged.

The recess 14 has a contour 14a in its transverse section perpendicular to its depth direction which is preferably a circle or an oval as shown in FIG. 3A.
Such recess 14 can maintain a high rigidity of the micro-protrusion 11, and helps to make the micro-protrusion 11 further blackish by absorbing light from various directions. In this embodiment, the contour 14a of the recess 14 in its transverse section is a circle.

When the contour 14a is an oval, the effect of diffusing the irradiated light is varied depending on the irradiation directions, therefore, it may be possible to give a kind of unpredictability to the appearance of a marking made up of the decorative region 10 and the non-decorative region 9.

It is preferable that the contour 14a of the recess 14 in its transverse section is larger in its upper end side than its lower end side to have higher rigidity in the lower end side and thereby suppress deformation of the micro-protrusion 11. Thus, tearing-off and cracking may be prevented.

In this embodiment, the contour 14a of the transverse section is continuously increased from the lower end toward the upper end. More specifically, in the micro-protrusion 11 in this embodiment, the inner surface 14S of the recess 14 is tapered from the upper end to the lower end over the entire length or depth although the contour 14a of the transverse section is not limited to such configuration.

It is preferable that, as shown in FIG. 3A, the depth Hc of the recess 14 measured from the peak point 16 is in a range from 15% to 100% of the maximum height H1max of the micro-protrusion 11.
If less than 15%, the light is liable to be reflected by the bottom surface of the recess 14, and the effect of making the micro-protrusion 11 further blackish may be decreased.
If more than 100%, the rigidity of the micro-protrusion 11 becomes insufficient, and the micro-protrusion 11 is liable to be damaged. Therefore, it is preferable that the depth Hc is set to be not more than 90% of the maximum height H1max.
It is also preferable that the depth HC is set in a range from 0.15 to 0.60 mm.

It is preferable that the maximum width L3 of the recess 14 is set in a range from 0.10 to 0.90 mm. The recess 14 has the maximum width L3 at its upper end.
If the maximum width L3 is less than 0.10 mm, the effect of absorbing light by the recess 14 tends to become less.
If the maximum width L3 is more than 0.90 mm, the rigidity of the micro-protrusion 11 is decreased, and the micro-protrusion 11 becomes liable to be damaged.

It is not essential, but preferable that the minimum width L4 of the recess 14 is not more than 100%, more preferably not more than 70% of the maximum width L3. The recess 14 has the minimum width L4 at its lower end.

It is preferable that, as shown in FIG. 2, the part of the decorative region 10 other than the micro-protrusions 11 includes a concavo-convex surface 25 whose 10-point average roughness (Rz) is 0.01 to 0.05 mm. Such concavo-convex surface 25 may create shadows on the decorative region 10 and helps to make this region further dark. Further, such concavo-convex surface 25 increases the rigidity of the decorative region 10 and suppresses the micro-protrusions 11 from being torn off. The 10-point average roughness (Rz) is measured according to Japanese Industrial Standard B0601(1994).

It is preferable that the arrangement pitches of the micro-protrusions 11 are set in a range from 0.6 to 1.0 mm. Here, the arrangement pitches are defined by the distances between the centroids of the above-said transverse sections of the micro-protrusions taken at the respective lower ends.

In this embodiment, the micro-protrusions 11 are arranged in a staggered manner.

Further, the micro-protrusions 11 may be arranged at nodes of an orthogonal grid for example.

The arrangement pitches may be varied within the above-said range. In this case, the micro-protrusions 11 may be randomly-arranged.

The micro-protrusions 11 are preferably disposed in an area of not less than 50% more preferably not less than 75%, most preferably 100% of the decorative region 10.

When the micro-protrusions 11 having a constant size are closely arranged, such decorative region 10 may be seen further darker and the contrast becomes clear.

FIG. 4A is a perspective view showing another example of the micro-protrusion 11, wherein the slant surface 21 constituting the upper end surface 15s of the wall portion 15 is a convexly curved surface 21B which is a part of a sphere.

FIG. 4B is a perspective view showing another example of the micro-protrusion 11, wherein the slant surface 21 constituting the upper end surface 15S of the wall portion 15 is a concavely curved surface 21C which is a part of a sphere.

Such curved surface 21B, 21C is preferable because the light diffusion effect is high in comparison with the flat surface 21A shown in FIG. 3.

Figure 5A:
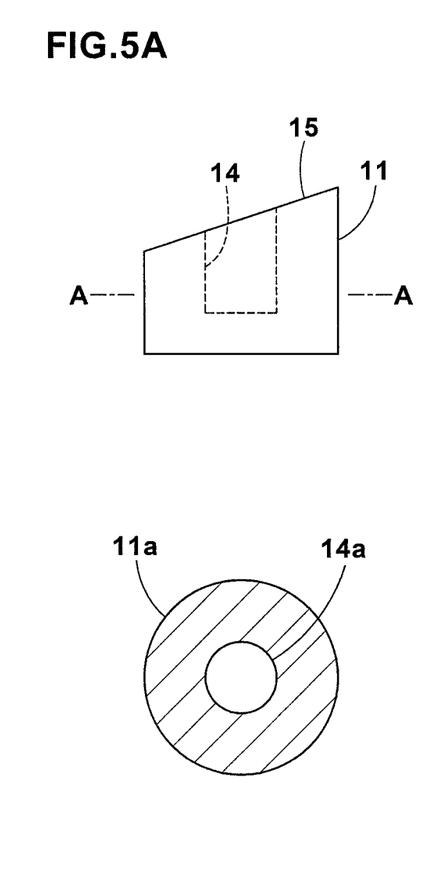
FIGS. 5A, 5B and 5C each show another example of the micro-protrusion as a side view (upper side) and a diagram (lower side) showing the contour of the transverse section of the micro-protrusion taken at a position of line A-A of the side view.

FIG. 5A shows another example of the micro-protrusion 11 in its side view (upper side of figure) and the contour 11a (lower side of figure) of the transverse section taken at the position of line A-A of the side view.

This example shows that the contour 11a of the transverse section of the micro-protrusion 11 has a constant size from its lower end to its upper end. That is, the micro-protrusion 11 is formed in the form of a cylinder.

Further, in this example, the contour 14a of the recess 14 in its transverse section also has a constant size from its lower end to the upper end.

Figure 5B:
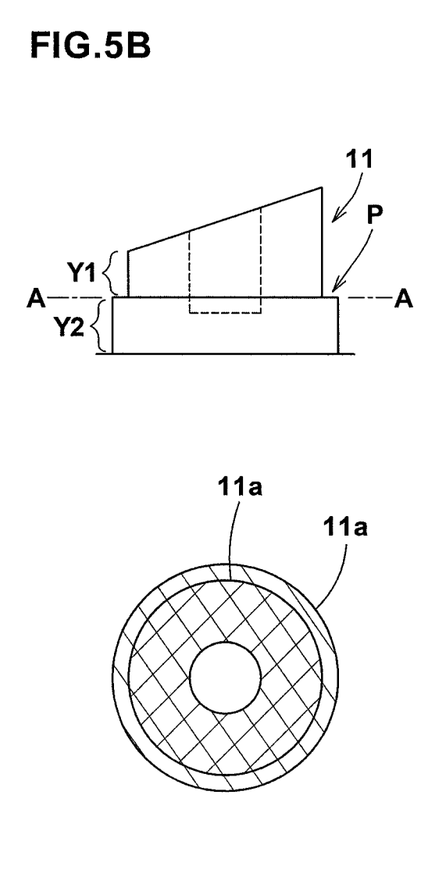

FIG. 5B shows another example of the micro-protrusion 11 in its side view (upper side of figure) and the contour 11a (lower side of figure) of the transverse section taken at the position of line A-A of the side view.

This example shows that the contour 11a of the transverse section of the micro-protrusion 11 is decreased in the size from its lower end toward its upper end in a stepwise manner at a position P. Thus, a step is formed at the position P.

The upper part Y1 and the lower part Y2 of the micro-protrusion 11 than the position P are each formed in the form of a cylinder. Such micro-protrusion 11 is possible to exert the effect to make the micro-protrusion 11 further blackish, and enhance the contrast of the decorative region with the non-decorative region, while maintaining high rigidity similarly to the tapered micro-protrusions 11 as shown in FIG. 3.

Further, it may be possible to form one or each of the parts Y1 and Y2 in a tapered manner similarly to FIG. 3.

In this example, one step is formed at the position P, but two or more steps may be formed at different positions.

Figure 5C:
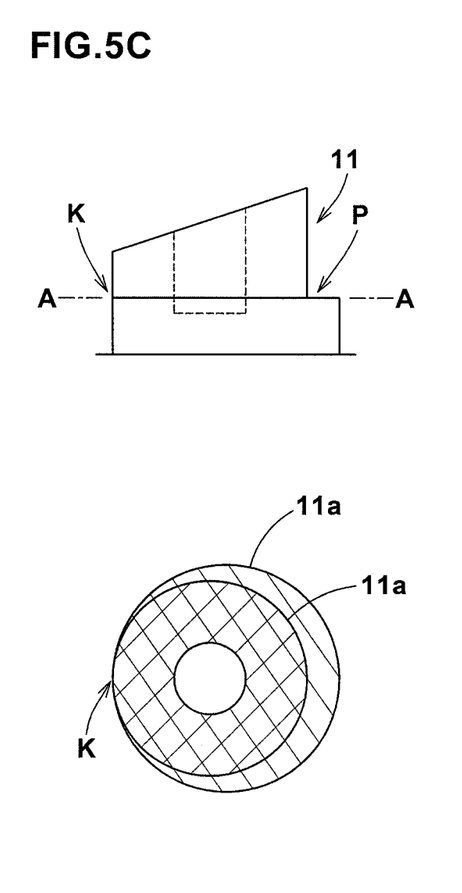

FIG. 5c shows another example of the micro-protrusion 11 in its side view (upper side of figure) and the contour 11a (lower side of figure) of the transverse section taken at the position of line A-A of the side view.

This example is a modification of the example shown in FIG. 5B. In the example shown in FIG. 5B, the center of the upper part Y1 is aligned with that of the lower part Y2. But, in this example, the center of the upper part Y1 is shifted from that of the lower part Y2.

At the position P at which the size of the contour 11a is changed in a stepwise manner, a part K of the contour 11a of the part Y1 coincides with a part K of the contour 11a of the part Y2. With such configuration, the contrast of the decorative region may be provided with a directional dependency, therefore, it is possible to give a kind of unpredictability to the appearance of a marking made up of the decorative region and the non-decorative region.

Figure 6A:
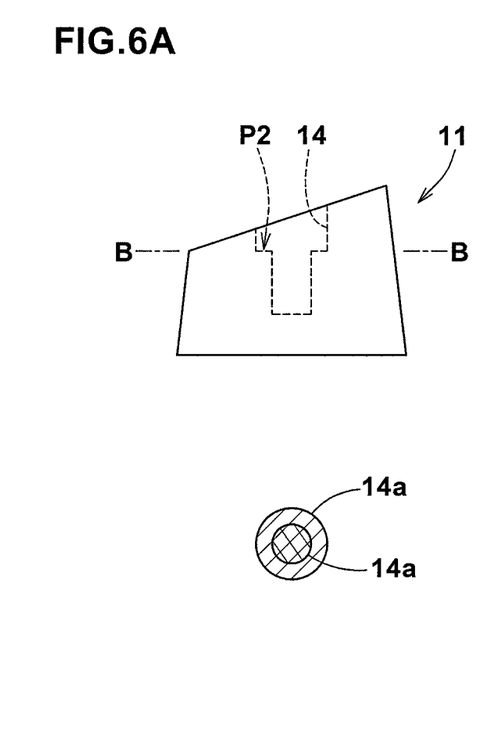
FIGS. 6A and 6B each show another example of the micro-protrusion as a side view (upper side) and a diagram (lower side) showing the contour of the transverse section of the recess taken at a position of line B-B of the side view.

FIG. 6A shows another example of the micro-protrusion 11 in its side view (upper side of figure) and the contour 14a (lower side of figure) of the recess 14 in its transverse section taken at the position of line B-B of the side view.

This example shows that the contour 14a of the transverse section of the recess 14 is increased in the size from its lower end toward its upper end in a stepwise manner at a position P2. Thus, a step is formed at the position P2.

In this example, one step is formed at the position P2, but two or more steps may be formed at different positions.

Such recess 14 may also exert the effect to absorb the irradiated light and enhance the contrast of the decorative region with the non-decorative region, while maintaining high rigidity similarly to the inversely-tapered recess 14 as shown in FIG. 3.

Figure 6B:
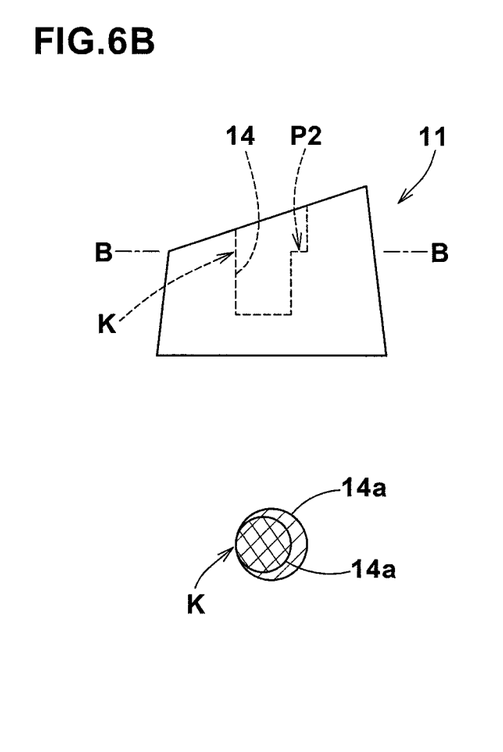

FIG. 6B shows another example of the micro-protrusion 11 in its side view (upper side of figure) and the contour 14a (lower side of figure) of the recess 14 in its transverse section taken at the position of line B-B of the side view. In this example, at the position P2 at which the size of the contour 14a is changed in a stepwise manner, a part K of the contour 14a of the upper part than the position P2 coincides with a part K of the contour 14a of the lower part than the position P2.

Figure 7A:
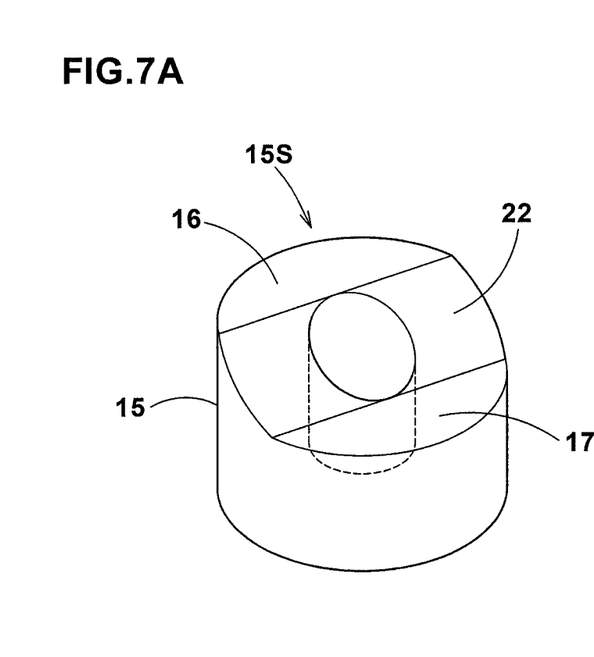
FIGS. 7A and 7B are perspective views of further examples the micro-protrusion.

FIG. 7A shows a further example of the micro-protrusion 11, wherein the upper end surface 15s of the wall portion 15 is made up of a flat face perpendicular to the protruding-height direction which defines the peak point 16, a flat face perpendicular to the protruding-height direction which defines the bottom point 17, and a flat face 22 extending between the peak point 16 and the bottom point 17 and inclined with respect to the protruding-height direction.

Figure 7B:
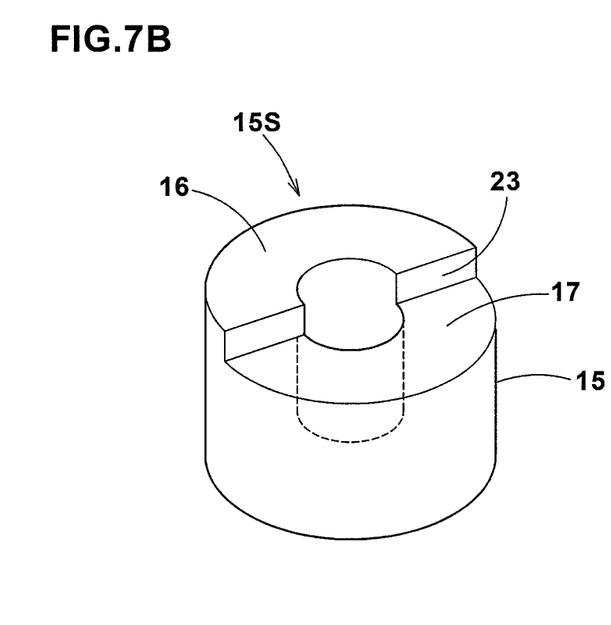

FIG. 7B shows a further example of the micro-protrusion 11, wherein the upper end surface 15S of the wall portion 15 is made up of a flat face perpendicular to the protruding-height direction which defines the peak point 16, a flat face perpendicular to the protruding-height direction which defines the bottom point 17, and a flat face 23 extending between the peak point 16 and the bottom point 17 in parallel with the protruding-height direction.

Figure 8A:
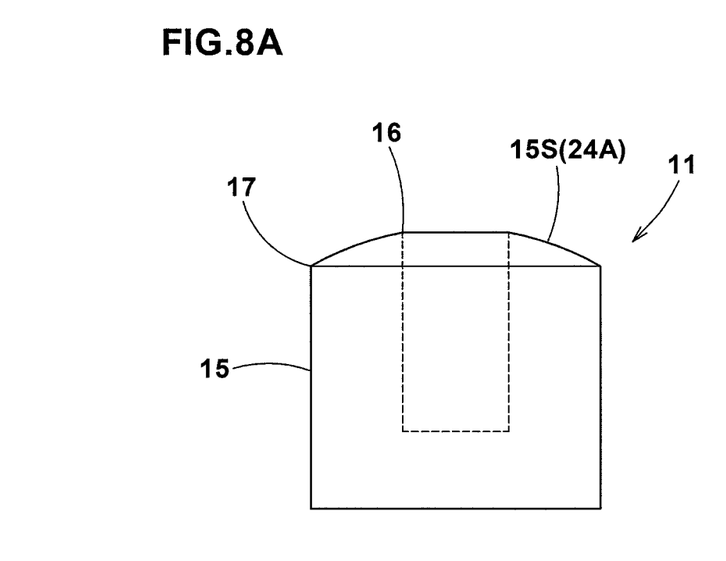
FIGS. 8A and 8B are side views of still further examples of the micro-protrusion.

FIG. 8A is a side view of a further example of the micro-protrusion 11, wherein the upper end surface 15s of the wall portion 15 is a convexly curved surface 24A which is a part of a sphere.

In this example, the convexly curved surface 24A is annular, and the outer peripheral edge of the curved surface 24A defines the bottom point 17, and the inner peripheral edge of the curved surface 24A defines the peak point 16.

Figure 8B:
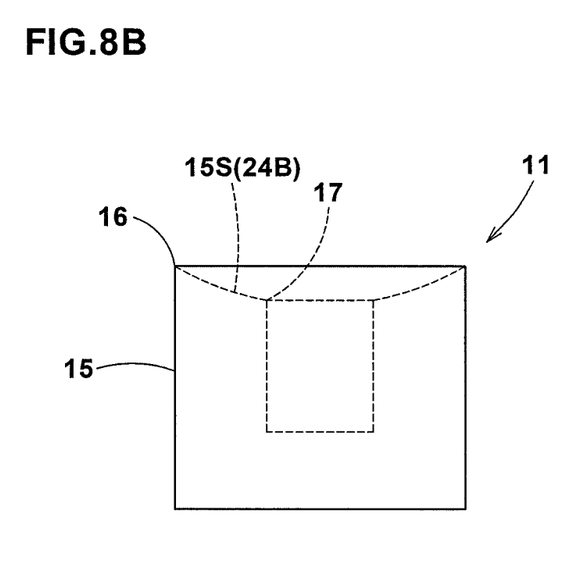

FIG. 8B is a side view of a further example of the micro-protrusion 11, wherein the upper end surface 15S of the wall portion 15 is a convexly curved surface 24B which is a part of a sphere.

In this example, the convexly curved surface 24B is annular, and the outer peripheral edge of the convexly curved surface 24B defines the peak point 16, and the inner peripheral edge of the convexly curved surface 24B defines the bottom point 17.

Figure 9A:
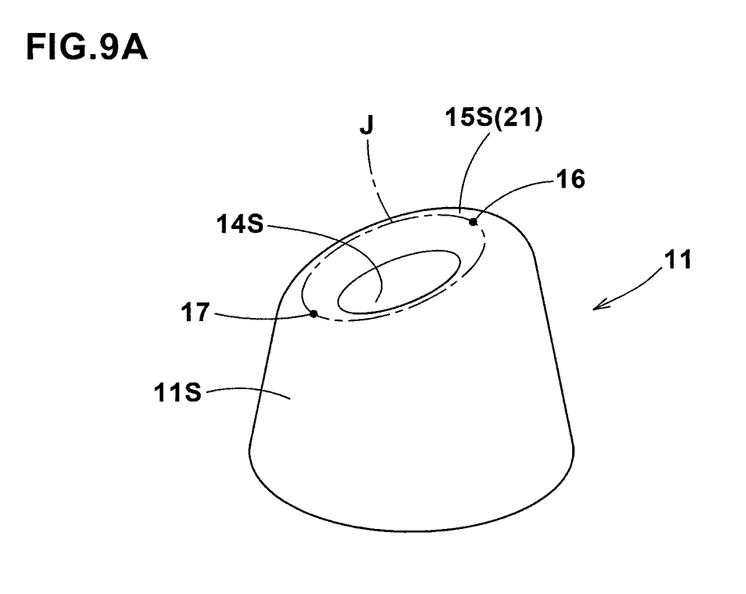
FIGS. 9A and 9B are a perspective view and a cross sectional view of still another example of the micro-protrusion.
Figure 9B:
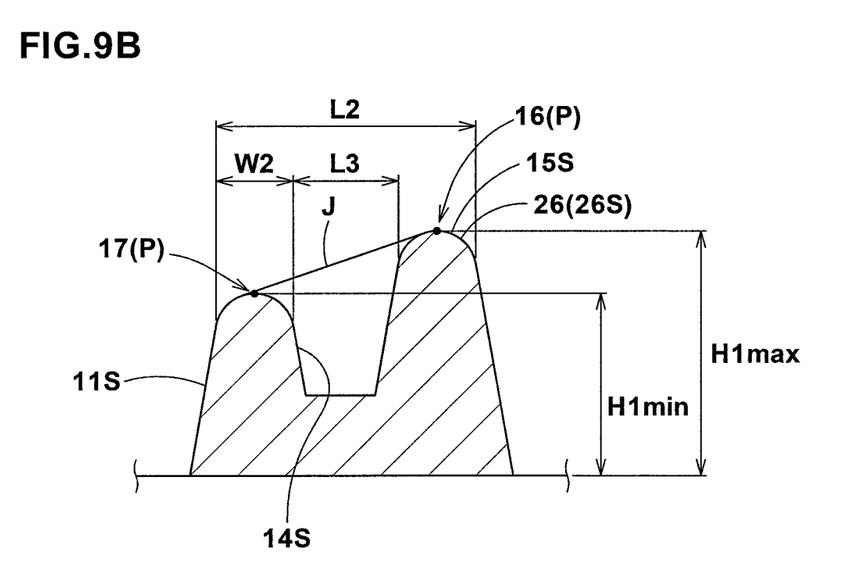

FIG. 9A and FIG. 9B show a further example of the micro-protrusion 11, wherein the upper end surface 15S of the wall portion 15 is a curved surface 26 like a part of a torus extending around the recess 14 while inclining with respect to the protruding-height direction.

More specifically, in a vertical cross section of the micro-protrusion 11 including the center line thereof as shown in FIG. 9B, the curved surface 26 is formed by an arc 26S extending between the outer surface 11S and the inner surface 14S.

In this example, the peak point 16 and the bottom point 17 are respectively defined by the maximum height position and the minimum height position of the ridge line J described by the vertex P of the arc 26S.

As shown in FIG. 9B, the minimum width L2 of the micro-protrusion 11 is defined between the intersecting points of the outer surface 11S and the arc 26S, and the maximum width L3 of the recess 14 is defined between the intersecting points of the inner surface 14S and the arc 26s in the above-said vertical cross section.

The decorative region 10 is formed from a rubber material of a rubber member of the tire 1 which forms, for example, the outer surface 3a of the tire 1.

For example, in a method of forming the decorative region 10, the decorative region 10 and non-decorative regions 9 are formed by using a mold for vulcanization-molding the tire, of which inner surface is provided with a reverse pattern of the non-decorative regions 9 and the decorative region 10 inclusive of the reverse pattern of the micro-protrusions 11. Thus, during vulcanization-molding the tire 1, the decorative region 10 is formed.

Further, in another method of forming the decorative region 10, the decorative region 10 is formed on the outer surface of the vulcanized tire 1 by computer control machining or computer control laser machining.

While detailed description has been made of preferable embodiments of the present invention, the present invention can be embodied in various forms without being limited to the illustrated embodiments.

Comparison Test

Pneumatic tires each having a sidewall portion provided in its outer surface with the decorative region 10 and the non-decorative regions 9 disposed therein as shown in FIG. 1 and FIG. 2 were experimentally manufactured and tested for the visibility of the non-decorative regions.

All of the pneumatic tires, namely, working examples (Ex.1-Ex.6) and comparative examples (Ref.1 and Ref.2) were identical except for the specifications shown in Table 1.

<Visibility Test>

Each test tire was visually observed by observers at a distance of 1 meter sideways from the sidewall portion, and the visibility was evaluated based on the contrast of the decorative region. The results are indicated in Table 1 by an index based on comparative example Ref. 1 being 100, wherein the larger the value, the higher the contrast, namely the better the visibility.

TABLE 1

| Tire <micro-protrusions> | Ref. 1 | Ref. 2 | Ex. 1 | Ex. 2 | Ex. 3 | Ex. 4 | Ex. 5 | Ex. 6 |
|---|---|---|---|---|---|---|---|---|
| side surface's configuration | | | tapered | | | | stepped | tapered |
| recess | absent | absent | present | | | | | |
| upper end surface's configuration | flat face perpendicular to protruding-height direction | flat face perpendicular to protruding-height direction | slant surface | slant surface | spherically-curved surface | spherically-curved surface | slant surface | slant surface |
| | | | FIG. 3A | FIG. 4A | FIG. 8A | FIG. 8B | FIG. 3A | |
| maximum height H1max (mm) | 0.25 | 0.25 | | | 0.35 | | | |
| the minimum height H1min (mm) | 0.25 | 0.25 | 0.15 | | 0.18 | | 0.15 | |
| difference dH (mm) | 0 | 0 | 0.2 | | 0.17 | | 0.2 | |
| minimum width L2 (mm) | | | 0.41 | | | | | |
| maximum width L1 (mm) | | | 0.54 | | | | | |
| recess's configuration | — | | inversely-tapered | | | | stepped | |
| recess's depth Hc (mm) | — | | 0.25 | | | | | |
| recess's maximum width L3 (mm) | — | | 0.31 | | 0.21 | | 0.31 | |
| recess's minimum width L4 (mm) | — | | 0.2 | | 0.15 | | 0.2 | |
| thickness W2 (mm) | — | | 0.05 | | 0.1 | | 0.05 | |
| visibility | 100 | 120 | 130 | 130 | 130 | 130 | 130 | 130 | micro-protrusions' arrangement pitches: 0.63 mm

It was confirmed that the tires according to the present invention were improved in the visibility.

REFERENCE SIGNS LIST 1 tire
1a outer surface
10 decorative region
11 micro-protrusion
11a contour of transverse section
11E protrusion's apex
14 recess
14a contour of transverse section
15 wall portion
15S upper end surface
16 peak point
17 bottom point
21 slant surface
21A flat surface
21B curved surface
21C curved surface
25 concavo-convex surface

The invention claimed is:

1. A tire having a visible outer surface comprising a decorative region provided with a plurality of micro-protrusions each comprising a recess and a wall portion,
said wall portion surrounding the recess and forming a protrusion's apex having an upper end surface, and
said apex comprising a peak point and a bottom point in a protruding-height direction of the micro-protrusion, wherein a protruding amount of the peak point is larger than a protruding amount of the bottom point, and
wherein, in the decorative region, 2 to 10 micro-protrusions are disposed per 1 sq·mm.

2. The tire according to claim 1, wherein
said upper end surface of the wall portion is a slant surface inclined with respect to the protruding-height direction, and an upper end and a lower end of the slant surface in the protruding-height direction define the peak point and the bottom point, respectively.

3. The tire according to claim 2, wherein
said slant surface is a flat surface or alternatively a curved surface which is a part of a sphere.

4. The tire according to claim 1, wherein
the micro-protrusions include a micro-protrusion whose contour in its transverse section perpendicular to the protruding-height direction is a circle or alternatively an oval.

5. The tire according to claim 1, wherein
the micro-protrusions include a micro-protrusion whose contour in its transverse section perpendicular to its protruding-height direction is smaller in its upper end side than its lower end side in the protruding-height direction.

6. The tire according to claim 5, wherein
the micro-protrusion whose contour is smaller in its upper end side than its lower end side, comprises a part in the protruding-height direction in which the contour becomes continuously smaller toward the upper end.

7. The tire according to claim 5, wherein
the micro-protrusion whose contour is smaller in its upper end side than its lower end side, comprises a part in the protruding-height direction at which the contour becomes smaller in a stepwise manner toward the upper end.

8. The tire according to claim 7, wherein
in said part at which the contour in the transverse section becomes smaller in a stepwise manner toward the upper end, the contour changes from a larger contour to a smaller contour, and a part of the larger contour coincides with a part of the smaller contour.

9. The tire according to claim 1, wherein
the contour of the recess in its transverse section perpendicular to its depth direction is a circle or alternatively an oval.

10. The tire according to claim 1, wherein
the contour of the recess in its transverse section perpendicular to its depth direction is larger in its upper end side than its lower end side in the depth direction.

11. The tire according to claim 10, wherein
the recess comprises a part in which the contour of the recess in its transverse section becomes continuously larger toward the upper end.

12. The tire according to claim 10, wherein
the recess comprises a part in which the contour of the recess in its transverse section becomes larger in a stepwise manner toward the upper end.

13. The tire according to claim 12, wherein
in said part at which the contour of the recess in its transverse section becomes larger in a stepwise manner toward the upper end, the contour changes from a larger contour to a smaller contour, and a part of the larger contour coincides with a part of the smaller contour.

14. The tire according to claim 1, wherein
the decorative region other than the micro-protrusions comprises a concave-convex surface whose 10-point average roughness (Rz) is in a range from 0.01 to 0.05 mm.

15. A tire having a visible outer surface comprising a decorative region provided with a plurality of micro-protrusions each comprising a recess and a wall portion,
said wall portion surrounding the recess and forming a protrusion's apex having an upper end surface, and
said apex comprising a peak point and a bottom point in a protruding-height direction of the micro-protrusion,
wherein a protruding amount of the peak point is larger than a protruding amount of the bottom point,
wherein the contour of the recess in its transverse section perpendicular to its depth direction is larger in its upper end side than its lower end side in the depth direction,
wherein the recess comprises a part in which the contour of the recess in its transverse section becomes larger in a stepwise manner toward the upper end, and
wherein in said part at which the contour of the recess in its transverse section becomes larger in a stepwise manner toward the upper end, the contour changes from a larger contour to a smaller contour, and a part of the larger contour coincides with a part of the smaller contour.

* * * * *